US010158934B2

(12) United States Patent
Boesen

(10) Patent No.: US 10,158,934 B2
(45) Date of Patent: Dec. 18, 2018

(54) CASE FOR MULTIPLE EARPIECE PAIRS

(71) Applicant: BRAGI GmbH, München (DE)

(72) Inventor: Peter Vincent Boesen, München (DE)

( * ) Notice: Subject to any disclaimer, the term of this patent is extended or adjusted under 35 U.S.C. 154(b) by 1 day.

(21) Appl. No.: 15/643,635

(22) Filed: Jul. 7, 2017

(65) Prior Publication Data

US 2018/0014109 A1 Jan. 11, 2018

Related U.S. Application Data

(60) Provisional application No. 62/359,566, filed on Jul. 7, 2016.

(51) Int. Cl.
*H04R 1/10* (2006.01)
*G02F 1/167* (2006.01)

(52) U.S. Cl.
CPC ......... *H04R 1/1041* (2013.01); *H04R 1/1016* (2013.01); *H04R 1/1025* (2013.01); *G02F 1/167* (2013.01); *H04R 2420/07* (2013.01)

(58) Field of Classification Search
CPC .. H04R 1/1041; H04R 1/1016; H04R 1/1025; H04R 2420/07; G02F 1/167
See application file for complete search history.

(56) References Cited

U.S. PATENT DOCUMENTS

| | | | |
|---|---|---|---|
| 2,325,590 | A | 8/1943 | Carlisle et al. |
| 2,430,229 | A | 11/1947 | Kelsey |
| 3,047,089 | A | 7/1962 | Zwislocki |
| D208,784 | S | 10/1967 | Sanzone |
| 3,586,794 | A | 6/1971 | Michaelis |
| 3,934,100 | A | 1/1976 | Harada |
| 3,983,336 | A | 9/1976 | Malek et al. |
| 4,069,400 | A | 1/1978 | Johanson et al. |
| 4,150,262 | A | 4/1979 | Ono |
| 4,334,315 | A | 6/1982 | Ono et al. |
| D266,271 | S | 9/1982 | Johanson et al. |
| 4,375,016 | A | 2/1983 | Harada |
| 4,588,867 | A | 5/1986 | Konomi |
| 4,617,429 | A | 10/1986 | Bellafiore |
| 4,654,883 | A | 3/1987 | Iwata |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Sonia Gay
(74) *Attorney, Agent, or Firm* — Goodhue, Coleman & Owens, P.C.

(57) ABSTRACT

A system includes a plurality of earpiece sets, each of the earpiece sets comprising a left earpiece and a right earpiece and a smart case. The smart case includes a case housing, a plurality of receptacle sets disposed within the case housing, wherein the receptacle sets are configured to hold the plurality of earpiece sets, a processor disposed within the case housing, and a transceiver disposed within the housing and operatively connected to the processor.

11 Claims, 6 Drawing Sheets

(56) References Cited

U.S. PATENT DOCUMENTS

| | | | |
|---|---|---|---|
| 4,682,180 | A | 7/1987 | Gans |
| 4,791,673 | A | 12/1988 | Schreiber |
| 4,852,177 | A | 7/1989 | Ambrose |
| 4,865,044 | A | 9/1989 | Wallace et al. |
| 4,984,277 | A | 1/1991 | Bisgaard et al. |
| 5,008,943 | A | 4/1991 | Arndt et al. |
| 5,185,802 | A | 2/1993 | Stanton |
| 5,191,602 | A | 3/1993 | Regen et al. |
| 5,201,007 | A | 4/1993 | Ward et al. |
| 5,201,008 | A | 4/1993 | Arndt et al. |
| D340,286 | S | 10/1993 | Seo |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,347,584 | A | 9/1994 | Narisawa |
| 5,363,444 | A | 11/1994 | Norris |
| D367,113 | S | 2/1996 | Weeks |
| 5,497,339 | A | 3/1996 | Bernard |
| 5,606,621 | A | 2/1997 | Reiter et al. |
| 5,613,222 | A | 3/1997 | Guenther |
| 5,654,530 | A | 8/1997 | Sauer et al. |
| 5,692,059 | A | 11/1997 | Kruger |
| 5,721,783 | A | 2/1998 | Anderson |
| 5,748,743 | A | 5/1998 | Weeks |
| 5,749,072 | A | 5/1998 | Mazurkiewicz et al. |
| 5,771,438 | A | 6/1998 | Palermo et al. |
| D397,796 | S | 9/1998 | Yabe et al. |
| 5,802,167 | A | 9/1998 | Hong |
| D410,008 | S | 5/1999 | Almqvist |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,084,526 | A | 7/2000 | Blotky et al. |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,208,372 | B1 | 3/2001 | Barraclough |
| 6,230,029 | B1 | 5/2001 | Yegiazaryan et al. |
| 6,275,789 | B1 | 8/2001 | Moser et al. |
| 6,339,754 | B1 | 1/2002 | Flanagan et al. |
| D455,835 | S | 4/2002 | Anderson et al. |
| 6,408,081 | B1 | 6/2002 | Boesen |
| 6,424,820 | B1 | 7/2002 | Burdick et al. |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,542,721 | B2 | 4/2003 | Boesen |
| 6,560,468 | B1 | 5/2003 | Boesen |
| 6,654,721 | B2 | 11/2003 | Handelman |
| 6,664,713 | B2 | 12/2003 | Boesen |
| 6,690,807 | B1 | 2/2004 | Meyer |
| 6,694,180 | B1 | 2/2004 | Boesen |
| 6,718,043 | B1 | 4/2004 | Boesen |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,952,483 | B2 | 10/2005 | Boesen et al. |
| 6,987,986 | B2 | 1/2006 | Boesen |
| 7,010,137 | B1 | 3/2006 | Leedom et al. |
| 7,113,611 | B2 | 9/2006 | Leedom et al. |
| D532,520 | S | 11/2006 | Kampmeier et al. |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| D549,222 | S | 8/2007 | Huang |
| D554,756 | S | 11/2007 | Sjursen et al. |
| 7,403,629 | B1 | 7/2008 | Aceti et al. |
| D579,006 | S | 10/2008 | Kim et al. |
| 7,463,902 | B2 | 12/2008 | Boesen |
| 7,508,411 | B2 | 3/2009 | Boesen |
| D601,134 | S | 9/2009 | Elabidi et al. |
| 7,825,626 | B2 | 11/2010 | Kozisek |
| 7,965,855 | B1 | 6/2011 | Ham |
| 7,979,035 | B2 | 7/2011 | Griffin et al. |
| 7,983,628 | B2 | 7/2011 | Boesen |
| D647,491 | S | 10/2011 | Chen et al. |
| 8,095,188 | B2 | 1/2012 | Shi |
| 8,108,143 | B1 | 1/2012 | Tester |
| 8,140,357 | B1 | 3/2012 | Boesen |
| D666,581 | S | 9/2012 | Perez |
| 8,300,864 | B2 | 10/2012 | Müllenborn et al. |
| 8,406,448 | B2 | 3/2013 | Lin |
| 8,436,780 | B2 | 5/2013 | Schantz et al. |
| D687,021 | S | 7/2013 | Yuen |
| 8,719,877 | B2 | 5/2014 | VonDoenhoff et al. |
| 8,774,434 | B2 | 7/2014 | Zhao et al. |
| 8,831,266 | B1 | 9/2014 | Huang |
| 8,891,800 | B1 | 11/2014 | Shaffer |
| 8,994,498 | B2 | 3/2015 | Agrafioti et al. |
| D728,107 | S | 4/2015 | Martin et al. |
| 9,013,145 | B2 | 4/2015 | Castillo et al. |
| 9,037,125 | B1 | 5/2015 | Kadous |
| D733,103 | S | 6/2015 | Jeong et al. |
| 9,081,944 | B2 | 7/2015 | Camacho et al. |
| 9,277,320 | B1 * | 3/2016 | Hoskins ................. H04R 5/033 |
| 9,510,159 | B1 | 11/2016 | Cuddihy et al. |
| D773,439 | S | 12/2016 | Walker |
| D775,158 | S | 12/2016 | Dong et al. |
| D777,710 | S | 1/2017 | Palmborg et al. |
| D788,079 | S | 5/2017 | Son et al. |
| 2001/0005197 | A1 | 6/2001 | Mishra et al. |
| 2001/0027121 | A1 | 10/2001 | Boesen |
| 2001/0043707 | A1 | 11/2001 | Leedom |
| 2001/0056350 | A1 | 12/2001 | Calderone et al. |
| 2002/0002413 | A1 | 1/2002 | Tokue |
| 2002/0007510 | A1 | 1/2002 | Mann |
| 2002/0010590 | A1 | 1/2002 | Lee |
| 2002/0030637 | A1 | 3/2002 | Mann |
| 2002/0046035 | A1 | 4/2002 | Kitahara et al. |
| 2002/0057810 | A1 | 5/2002 | Boesen |
| 2002/0076073 | A1 | 6/2002 | Taenzer et al. |
| 2002/0118852 | A1 | 8/2002 | Boesen |
| 2003/0002705 | A1 | 1/2003 | Boesen |
| 2003/0065504 | A1 | 4/2003 | Kraemer et al. |
| 2003/0100331 | A1 | 5/2003 | Dress et al. |
| 2003/0104806 | A1 | 6/2003 | Ruef et al. |
| 2003/0115068 | A1 | 6/2003 | Boesen |
| 2003/0125096 | A1 | 7/2003 | Boesen |
| 2003/0218064 | A1 | 11/2003 | Conner et al. |
| 2004/0070564 | A1 | 4/2004 | Dawson et al. |
| 2004/0160511 | A1 | 8/2004 | Boesen |
| 2005/0017842 | A1 | 1/2005 | Dematteo |
| 2005/0043056 | A1 | 2/2005 | Boesen |
| 2005/0094839 | A1 | 5/2005 | Gwee |
| 2005/0125320 | A1 | 6/2005 | Boesen |
| 2005/0148883 | A1 | 7/2005 | Boesen |
| 2005/0165663 | A1 | 7/2005 | Razumov |
| 2005/0196009 | A1 | 9/2005 | Boesen |
| 2005/0251455 | A1 | 11/2005 | Boesen |
| 2005/0266876 | A1 | 12/2005 | Boesen |
| 2006/0029246 | A1 | 2/2006 | Boesen |
| 2006/0074671 | A1 | 4/2006 | Farmaner et al. |
| 2006/0074808 | A1 | 4/2006 | Boesen |
| 2006/0166715 | A1 | 7/2006 | Engelen et al. |
| 2006/0166716 | A1 | 7/2006 | Seshadri et al. |
| 2006/0220915 | A1 | 10/2006 | Bauer |
| 2006/0258412 | A1 | 11/2006 | Liu |

(56) References Cited

U.S. PATENT DOCUMENTS

| | | | | |
|---|---|---|---|---|
| 2007/0105599 | A1* | 5/2007 | Hsu | H04M 1/04 455/573 |
| 2008/0076972 | A1 | 3/2008 | Dorogusker et al. | |
| 2008/0090622 | A1 | 4/2008 | Kim et al. | |
| 2008/0146890 | A1 | 6/2008 | LeBoeuf et al. | |
| 2008/0254780 | A1 | 10/2008 | Kuhl et al. | |
| 2008/0255430 | A1 | 10/2008 | Alexandersson et al. | |
| 2009/0003620 | A1 | 1/2009 | McKillop et al. | |
| 2009/0008275 | A1 | 1/2009 | Ferrari et al. | |
| 2009/0017881 | A1 | 1/2009 | Madrigal | |
| 2009/0073070 | A1 | 3/2009 | Rofougaran | |
| 2009/0097689 | A1 | 4/2009 | Prest et al. | |
| 2009/0105548 | A1 | 4/2009 | Bart | |
| 2009/0191920 | A1 | 7/2009 | Regen et al. | |
| 2009/0215502 | A1* | 8/2009 | Griffin, Jr. | H04M 1/6066 455/569.1 |
| 2009/0245559 | A1 | 10/2009 | Boltyenkov et al. | |
| 2009/0261114 | A1 | 10/2009 | McGuire et al. | |
| 2009/0296968 | A1 | 12/2009 | Wu et al. | |
| 2010/0033313 | A1 | 2/2010 | Keady et al. | |
| 2010/0203831 | A1 | 8/2010 | Muth | |
| 2010/0210212 | A1 | 8/2010 | Sato | |
| 2010/0320961 | A1 | 12/2010 | Castillo et al. | |
| 2011/0140844 | A1 | 6/2011 | McGuire et al. | |
| 2011/0239497 | A1 | 10/2011 | McGuire et al. | |
| 2011/0286615 | A1 | 11/2011 | Olodort et al. | |
| 2012/0057740 | A1 | 3/2012 | Rosal | |
| 2013/0316642 | A1 | 11/2013 | Newham | |
| 2013/0346168 | A1 | 12/2013 | Zhou et al. | |
| 2014/0079257 | A1 | 3/2014 | Ruwe et al. | |
| 2014/0106677 | A1 | 4/2014 | Altman | |
| 2014/0122116 | A1 | 5/2014 | Smythe | |
| 2014/0163771 | A1 | 6/2014 | Demeniuk | |
| 2014/0185828 | A1 | 7/2014 | Helbling | |
| 2014/0222462 | A1 | 8/2014 | Shakil et al. | |
| 2014/0235169 | A1 | 8/2014 | Parkinson et al. | |
| 2014/0270227 | A1 | 9/2014 | Swanson | |
| 2014/0270271 | A1 | 9/2014 | Dehe et al. | |
| 2014/0274215 | A1* | 9/2014 | Del Toro | G06F 1/1628 455/566 |
| 2014/0348367 | A1 | 11/2014 | Vavrus et al. | |
| 2015/0028996 | A1 | 1/2015 | Agrafioti et al. | |
| 2015/0110587 | A1 | 4/2015 | Hori | |
| 2015/0148093 | A1* | 5/2015 | Huang | H04W 52/0225 455/522 |
| 2015/0148989 | A1 | 5/2015 | Cooper et al. | |
| 2015/0245127 | A1 | 8/2015 | Shaffer | |
| 2016/0029114 | A1* | 1/2016 | Chen | H04R 1/1041 381/74 |
| 2016/0033280 | A1 | 2/2016 | Moore et al. | |
| 2016/0072558 | A1 | 3/2016 | Hirsch et al. | |
| 2016/0073189 | A1 | 3/2016 | Lindén et al. | |
| 2016/0125892 | A1 | 5/2016 | Bowen et al. | |
| 2016/0360350 | A1 | 12/2016 | Watson et al. | |
| 2017/0064437 | A1 | 3/2017 | Hviid et al. | |
| 2017/0078780 | A1 | 3/2017 | Qian et al. | |
| 2017/0111726 | A1 | 4/2017 | Martin et al. | |
| 2017/0155992 | A1 | 6/2017 | Perianu et al. | |
| 2017/0289668 | A1* | 10/2017 | Kim | H04R 1/1041 |
| 2017/0339482 | A1* | 11/2017 | Schrems | H04R 1/1025 |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 4/1981 |
| GB | 2508226 | A | 5/2014 |
| WO | 2008103925 | A1 | 8/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |

OTHER PUBLICATIONS

Announcing the $3,333,333 Stretch Goal (Feb. 24, 2014).

Ben Coxworth: "Graphene-based ink could enable low-cost, foldable electronics", "Journal of Physical Chemistry Letters", Northwestern University, (May 22, 2013).

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI Is On Facebook (2014).

BRAGI Update—Arrival Of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready To Rumble, A Lot To Be Done Over Christmas (Dec. 22, 2014).

BRAGI Update—Memories From April—Update On Progress (Sep. 16, 2014).

BRAGI Update—Memories from May—Update On Progress—Sweet (Oct. 13, 2014).

BRAGI Update—Memories From One Month Before Kickstarter—Update On Progress (Jul. 10, 2014).

BRAGI Update—Memories From The First Month of Kickstarter—Update on Progress (Aug. 1, 2014).

BRAGI Update—Memories From The Second Month of Kickstarter—Update On Progress (Aug. 22, 2014).

BRAGI Update—New People @BRAGI—Prototypes (Jun. 26, 2014).

BRAGI Update—Office Tour, Tour To China, Tour To CES (Dec. 11, 2014).

BRAGI Update—Status On Wireless, Bits and Pieces, Testing-Oh Yeah, Timeline(Apr. 24, 2015).

BRAGI Update—The App Preview, The Charger, The SDK, BRAGI Funding and Chinese New Year (Feb. 11, 2015).

BRAGI Update—What We Did Over Christmas, Las Vegas & CES (Jan. 19, 2014).

BRAGI Update—Years of Development, Moments of Utter Joy and Finishing What We Started(Jun. 5, 2015).

BRAGI Update—Alpha 5 and Back To China, Backer Day, On Track(May 16, 2015).

BRAGI Update—Beta2 Production and Factory Line(Aug. 20, 2015).

BRAGI Update—Certifications, Production, Ramping Up.

BRAGI Update—Developer Units Shipping and Status(Oct. 5, 2015).

BRAGI Update—Developer Units Started Shipping and Status (Oct. 19, 2015).

BRAGI Update—Developer Units, Investment, Story and Status(Nov. 2, 2015).

BRAGI Update—Getting Close(Aug. 6, 2015).

BRAGI Update—On Track, Design Verification, How It Works and What's Next(Jul. 15, 2015).

BRAGI Update—On Track, On Track and Gems Overview.

BRAGI Update—Status On Wireless, Supply, Timeline and Open House@BRAGI(Apr. 1, 2015).

BRAGI Update—Unpacking Video, Reviews On Audio Perform and Boy Are We Getting Close(Sep. 10, 2015).

Healthcare Risk Management Review, "Nuance updates computer-assisted physician documentation solution" (Oct. 20, 2016).

(56) References Cited

OTHER PUBLICATIONS

Hoyt et. al., "Lessons Learned from Implementation of Voice Recognition for Documentation in the Military Electronic Health Record System", The American Health Information Management Association (2017).
Hyundai Motor America, "Hyundai Motor Company Introduces A Health + Mobility Concept For Wellness In Mobility", Fountain Valley, Californa (2017).
International Search Report & Written Opinion, PCT/EP2016/070231 (dated Nov. 18, 2016).
Last Push Before The Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

CASE FOR MULTIPLE EARPIECE PAIRS

PRIORITY STATEMENT

The present application claims priority to U.S. Provisional Patent Application No. 62/359,566, entitled, "Case for multiple earpiece pairs", hereby incorporated by reference in its entirety.

FIELD OF THE INVENTION

The present invention relates to wearable devices. More particularly, but not exclusively, the present invention relates to earpieces.

BACKGROUND

One problem users have with earpieces is that when the batteries run low, they need to be recharged. However, when the devices are being recharged, the devices cannot be worn for use. Thus there exists a need for a system that can allow a user relatively uninterrupted use or enjoyment of an earpiece without having to wait for the earpieces to recharge.

SUMMARY

Therefore, it is a primary object, feature, or advantage of the present invention to improve over the state of the art.

It is a further object, feature, or advantage of the present invention to provide an extra set of earpieces such that a user will always have access to a functional set of earpieces if one set becomes inoperative.

It is a still further object, feature, or advantage of the present invention to synchronize the earpiece sets so that a user can remove one set of earpieces, place them in a smart case, and obtain a functional second set of earpieces ready for use that recommences where the previous earpiece set left off.

Another object, feature, or advantage is a smart case configured to hold at least two sets of earpieces.

Yet another object, feature, or advantage is a display such as an e-ink display mounted onto the smart case allowing for displaying notes and annotation or other information.

According to one aspect a system includes a plurality of earpiece sets, each of the earpiece sets comprising a left earpiece and a right earpiece and a smart case. The smart case includes a case housing, a plurality of receptacle sets disposed within the case housing, wherein the receptacle sets are configured to hold the plurality of earpiece sets. The smart case further includes a processor disposed within the case housing and a transceiver disposed within the housing and operatively connected to the processor. The smart case may further include a display operatively connected to the case housing which may be an e-ink display. The processor may be configured to synchronize with a processor disposed within an earpiece within the plurality of earpieces sets and transfer files between the smart case and the earpiece. The smart case may include a power interface. The system may further include a battery disposed within the case housing and operatively connected to the power interface. The smart case may further include a speaker operatively connected to the processor and wherein the processor provides for receiving audio wirelessly from an earpiece and transducing the audio at the speaker and/or receiving audio from an earpiece positioned within one of the receptacle sets and transducing the audio at the speaker.

According to another aspect, a smart case for a plurality of sets of wireless earpieces includes a case housing, a plurality of ear piece receptacles disposed within the case housing, wherein the ear piece receptacles are configured to hold earpiece within the plurality of sets of wireless earpieces, a plurality of earpiece interfaces to connect with each of the earpieces within the earpiece sets when the earpieces are within receptacles, a processor disposed within the case housing, and a transceiver disposed within the housing and operatively connected to the processor. The processor is configured to communicate with the earpieces when the earpieces are positioned within the ear piece receptacles and connected with the earpiece interfaces. The processor is further configured to wirelessly communicate when the earpieces are not connected with the earpiece interfaces using the transceiver. The processor may be configured to synchronize data such as audio files between one or more of the earpieces and the smart case. The smart case may further include a display operatively connected to the processor. A rechargeable battery may be disposed within the smart case and a power interface may be operatively connected to the rechargeable battery for charging the rechargeable battery.

In one embodiment, an earpiece includes an earpiece housing, an input device mounted onto the earpiece housing, a processor configured to synchronize data, disposed within the earpiece housing, and operatively connected to the input device, a speaker mounted onto the housing and operatively connected to the processor, a transceiver disposed within the earpiece housing and operatively connected to the processor, and an antenna operatively connected to the transceiver, wherein the antenna is configured to both receive synchronization signals from and transmit synchronization signals to another earpiece.

One or more of the following features may be included. The processor may be configurable by the input device. The input device may be a microphone configured to receive audio signals. The input device may be a gesture control interface configured to receive gestures. The processor may be configurable by first synchronization signals received by the antenna. The left earpiece may be configured to reciprocally synchronize data with the right earpiece. A processor disposed within the left earpiece may be further configured to reciprocally synchronize data with a processor disposed within the left earpiece of the second set of earpieces via a first synchronization signal from the left earpiece. A processor disposed within the right earpiece of the first set of earpieces may be further configured to reciprocally synchronize data with a processor disposed within the right earpiece of the second set of earpieces via a first synchronization signal from the right earpiece. A processor disposed within the left earpiece may be further configured to reciprocally synchronize data with a smart case. The smart case may be configured to reciprocally synchronize data with a processor disposed within the right earpiece. A processor disposed within the left earpiece may be configured to reciprocally synchronize data with a mobile device. The mobile device may be configured to reciprocally synchronize data with a processor disposed within the right earpiece.

In another embodiment, a system includes a plurality of earpiece sets, and a smart case comprising a case housing comprising a top side, a plurality of receptacle sets disposed within the case housing, wherein the receptacle sets are configured to hold the plurality of earpiece sets; and a circuit board disposed within the case housing, wherein the circuit board comprises a processor, an energy source, a transceiver, an antenna and a connector protruding through each receptacle, wherein each connector is configured to mechanically couple with an earpiece.

One or more of the following features may be included. A display may be mounted onto the top side of the case housing. The case housing may be clamshell-shaped and comprise a top side, a front top side, a back top side, a left top side, and a right top side. A display may be mounted onto the top side of the clamshell-shaped housing. The display may instead be mounted onto the front top side of the clamshell-shaped case housing. Either display may be an e-ink display. An earpiece set may receive energy from the energy source if one or more earpieces are mechanically coupled to a connector. The processor may be configured to synchronize with a processor disposed within an earpiece in an earpiece set. The antenna may be configured to receive synchronization signals from an earpiece in an earpiece set. The antenna may be configured to transmit synchronization signals to an earpiece in an earpiece set.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an object, feature, or advantage stated herein.

DETAILED DESCRIPTION

Figure 1:
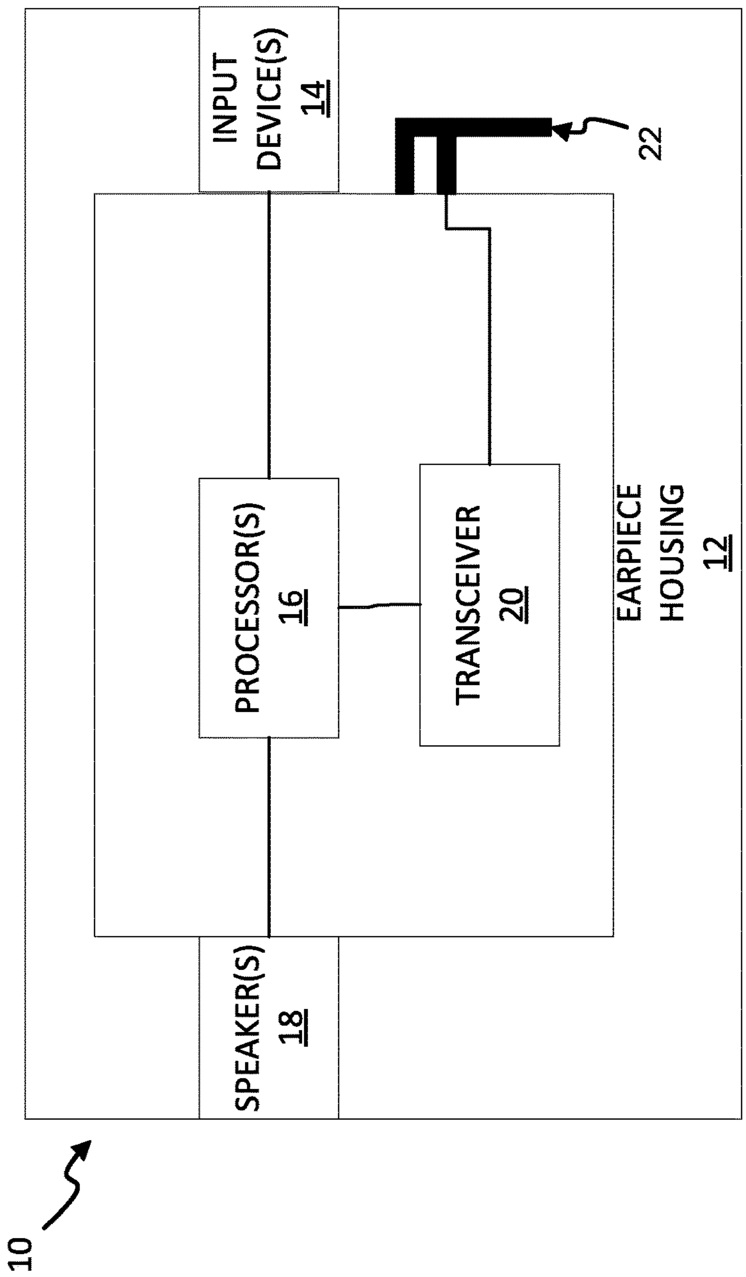
FIG. 1 illustrates one embodiment of the earpiece.

FIG. 1 illustrates one embodiment of an earpiece 10 to be used with a smart case. Each earpiece comprises an earpiece housing 12, at least one input device 14, a processor 16, a speaker 18, a transceiver 20, and an antenna 22. The earpiece housing 12 may be configured to comfortably fit within a user's ear and may have additional material attached to the outside that is non-allergic or increases user comfort. The earpiece housing 12 may be composed of materials that are resistant to shearing and straining stresses and may also be configured to be soundproof or waterproof. Many plastics or polymers in commercial use would satisfy these requirements. At least one input device 14 disposed within the earpiece housing 12 may allow a user to control one or more operations of the earpiece. For example, the input device 14 may be a microphone which allows a user to control the earpiece through voice commands or sounds understood by the earpiece. For example, a user may state a term such as "Off," "Stop," "Cease play," or any number of combinations of words to tell an earpiece 10 to cease transmitting sounds. A gesture control interface, which reads gestures produced by the user or a third party, may also be employed, with or without a microphone. For example, a user may swipe across the surface of an earpiece to turn the earpiece on or off, or tap the earpiece a number of times to switch between certain modes or functions programmed within the earpiece 10. The gesture interface may be implemented optically through using one or more emitters and one or more receives. Alternatively, the gesture interface may be implemented capacitively. Thus, a user generating a gesture changes an associated fields which can be identified and is indicative of the gesture being performed. A processor 16 is disposed within the earpiece housing 12 and is operatively connected to each component present within the earpiece 10. The processor 16 may be configured to control execution of any number of functions, including to play music, provide information, transmit a noise-cancellation sound, synchronize with another earpiece, synchronize with a smart case, synchronize with another mobile device, or any number of functions. A speaker 18 disposed within the earpiece housing 12 may be configured to transduce sound in response to commands from the processor 16. The sounds may be words, combinations of words, sounds, combinations of sounds, or any combination of the aforementioned. A transceiver 20 disposed within the earpiece housing 12 and an antenna 22 operatively connected to the transceiver 20 are configured to transmit or receive synchronization signals to and from another electronic device, which may include another earpiece, a mobile device, a smart case, a tablet, a laptop, a desktop computer, a router, a communications tower, or any number of electronic devices. For example, an antenna 22 may receive a signal from the other earpiece of an earpiece set to synchronize the transmission of sound in regards to a certain song, or transmit a signal to a communications tower in order to synchronize the internal clocks of the earpieces.

Figure 2:
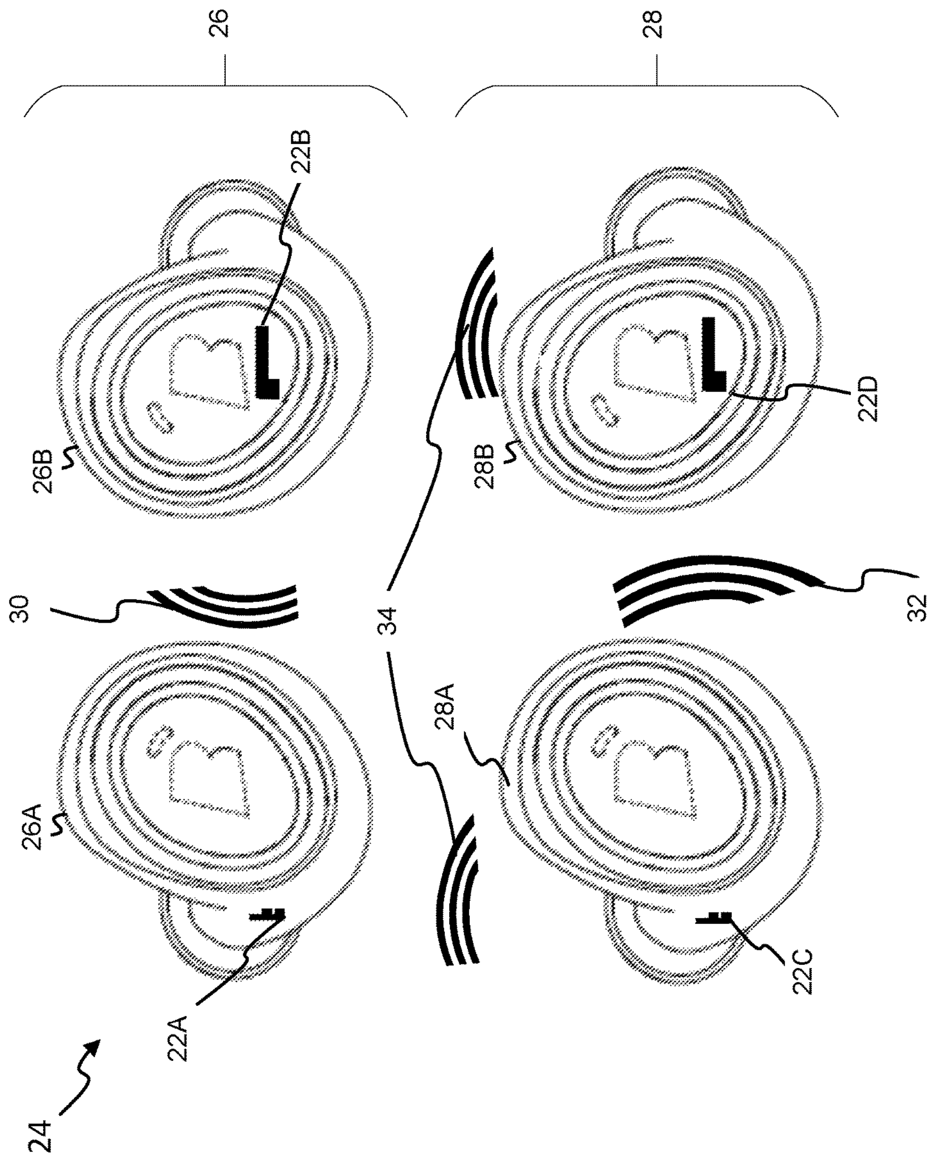
FIG. 2 illustrates a first set of earpieces and a second set of earpieces.

FIG. 2 illustrates a set of earpieces 24 comprised of a first set of earpieces 26 and a second set of earpieces 28. The right earpiece 26B may synchronize data with the left earpiece 26A via transmission of a first synchronization signal 30 through the right antenna 22B, which is received by the left antenna 22A. The first synchronization signal 30 may be a radio frequency (RF) signal, though other types of electromagnetic radiation may be used, and may encode for numerous types of data, including musical data, sound data, informational data, or instructions to be used by the left earpiece 26A to modify, change, or otherwise reconfigure one or more of its operations. A left earpiece 28A may also synchronize, reciprocally or otherwise, data with a right earpiece 28B via a second synchronization signal 32 transmitted through the left antenna 22C to the right antenna 22D. The data encoded in the second synchronization signal 32 may be the same type of data found in the first synchronization signal 30. The first set of earpieces 26 and the second set of earpieces 28 may also synchronize data with one another. For example, the first set of earpieces 26, which may be in the process of being recharged in a smart case, may receive synchronization signals 34 from the second set of earpieces 28, which are currently being worn by the user, to synchronize a song so that when the power in the second set of earpieces 28 runs out and the user needs to swap the second set of earpieces 28 for the first set of earpieces 26, the first set of earpieces 26 picks up the song at the point the user inserts the second set of earpieces 28 into a smart case for recharging or whenever the user instructs the second set of earpieces 28 to cease functioning. The synchronization signals 34 may be transmitted and received via antenna located within each earpiece set.

Figure 3:
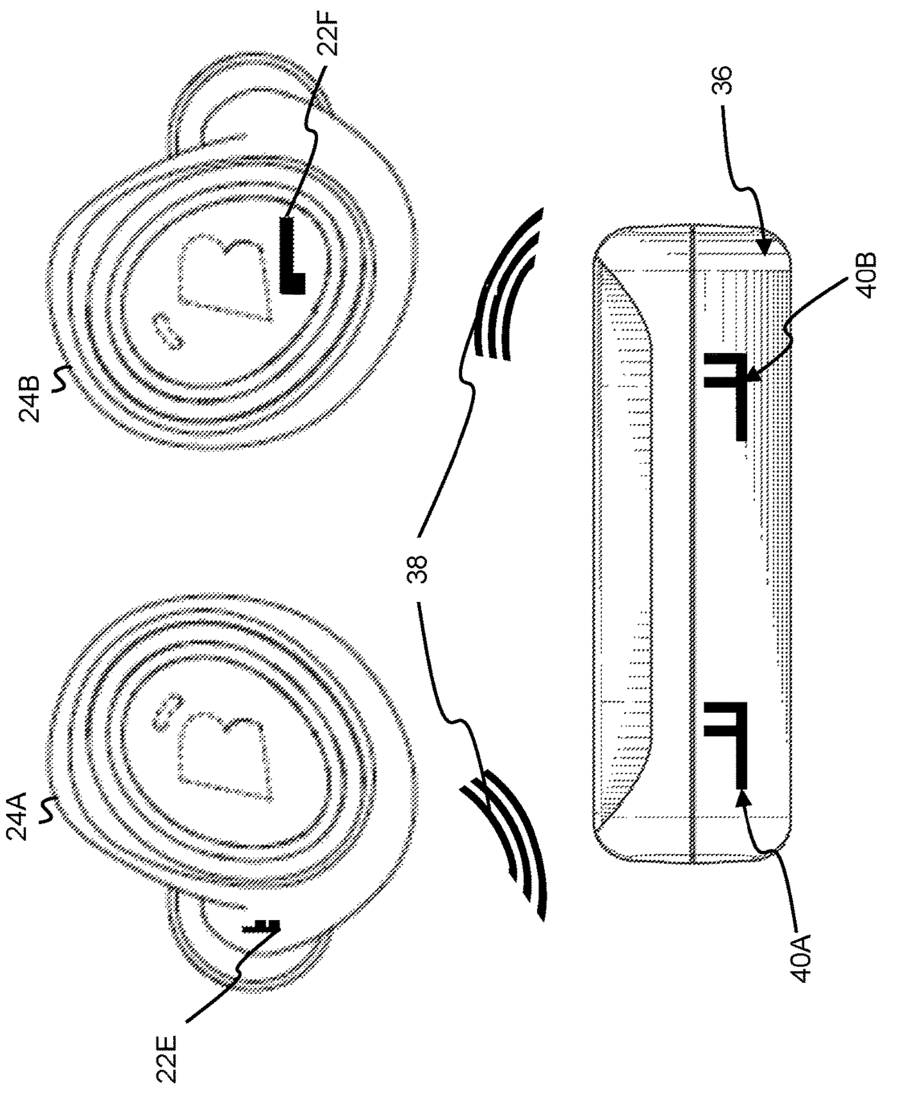
FIG. 3 illustrates a set of earpieces and a smart case.

FIG. 3 illustrates a set of earpieces 24 and a smart case 36. The left earpiece 24A may synchronize data via a third synchronization signal 38 transmitted by antenna 22E with either a processor or a data storage device located within the smart case 36 in order to synchronize data within the right earpiece 24B. The left earpiece 24A may be currently worn by a user, in possession of a third party, or attached to a receptacle within the smart case 36. The left earpiece 24A, if in a receptacle, may also be recharging. The third synchronization signal 38 may be a radio wave, though other types of electromagnetic radiation may be used, and may encode for numerous types of data, including musical data, sound data, informational data, or instructional data and may be used by the smart case 36 to modify, change, or otherwise reconfigure one or more operations within either the smart case 36 or the right earpiece 24B. The third synchronization signal 38, after reception by antenna 40A of the smart case 36 and, if necessary, one or more of the smart case's operations are modified, is retransmitted via antenna 40B to antenna 22F of right earpiece 24B. The right earpiece 24B, like left earpiece 24A, may be currently worn by a user, in possession of a third party, or attached to a receptacle within the smart case 36. The reception and transmission of the third synchronization signal 38 may be performed by the same antenna if necessary. The synchronization of the set of earpieces 24 may also be performed in reverse order, where the right earpiece 24B transmits the third synchronization signal 38 to the smart case 36 which then retransmits the third synchronization signal 38 to the left earpiece 24A.

Figure 4:
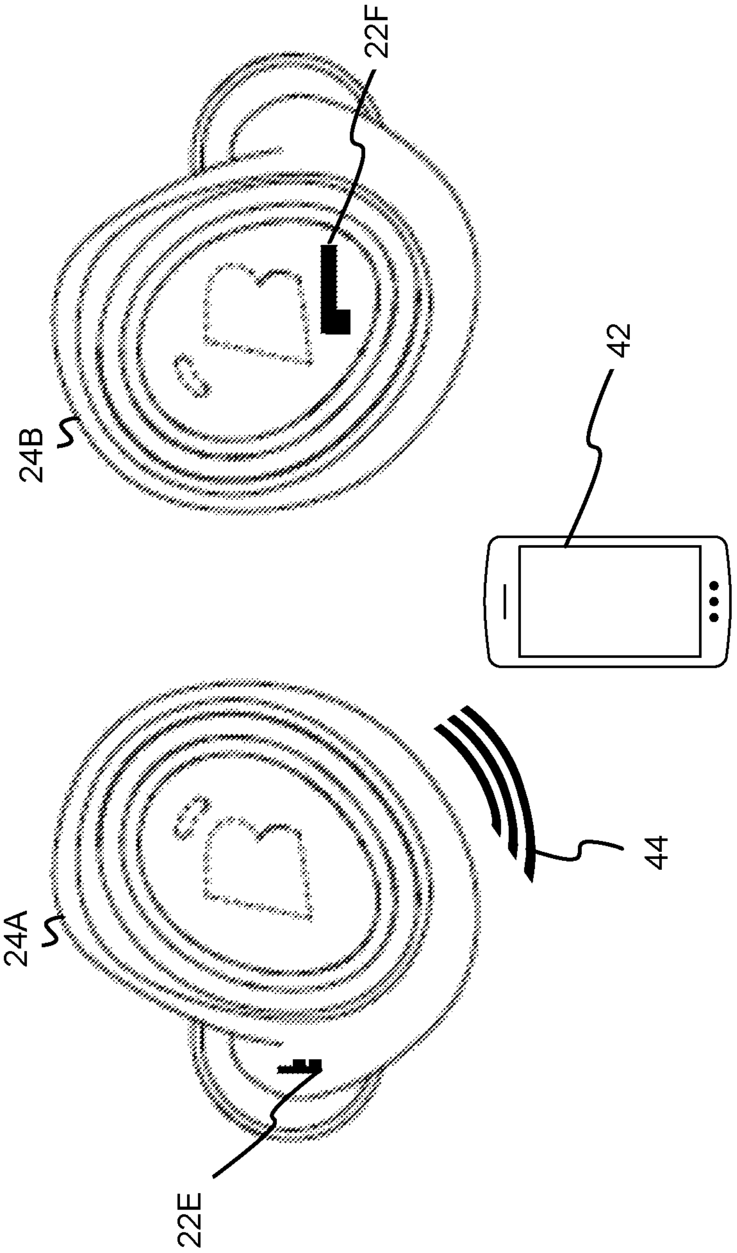
FIG. 4 illustrates the set of the earpieces and a mobile device.

FIG. 4 illustrates a set of earpieces 24 and a mobile phone 42. Similar to FIG. 3, the left earpiece 24A may synchronize data via a fourth synchronization signal 44 transmitted by antenna 22E with either a processor or a data storage device located within the mobile phone 42 in order to synchronize data within the right earpiece 24B. The left earpiece 24A may be currently worn by a user, in possession of a third party, or attached to a receptacle within the smart case 36. The fourth synchronization signal 44 may be a radio wave, though other types of electromagnetic radiation may be used, and may encode for numerous types of data, including musical data, sound data, informational data, or instructional data and may be used by the mobile phone 42 to modify, change, or otherwise reconfigure one or more operations within either the mobile phone 42 or the right earpiece 24B. In addition, a user may use an app programmed within the mobile phone 42 to modify or change the fourth synchronization signal 44, and the modification need not be performed while one of the earpieces is transmitting the fourth synchronization signal 44. The fourth synchronization signal 44, after reception by the mobile phone 42 and, if necessary, one or more of the mobile phone's operations are modified, may be retransmitted to antenna 22F of right earpiece 24B. The right earpiece 24B, like left earpiece 24A, may be currently worn by a user, in possession of a third party, or attached to a receptacle within the mobile phone 42. The reception and transmission of the fourth synchronization signal 44 may be performed by the same antenna if necessary. The synchronization of the set of earpieces 24 may also be performed in reverse order, where the right earpiece 24B transmits the fourth synchronization signal 44 to the mobile phone 42, which then retransmits the fourth synchronization signal 44 to the left earpiece 24A.

Figure 5:
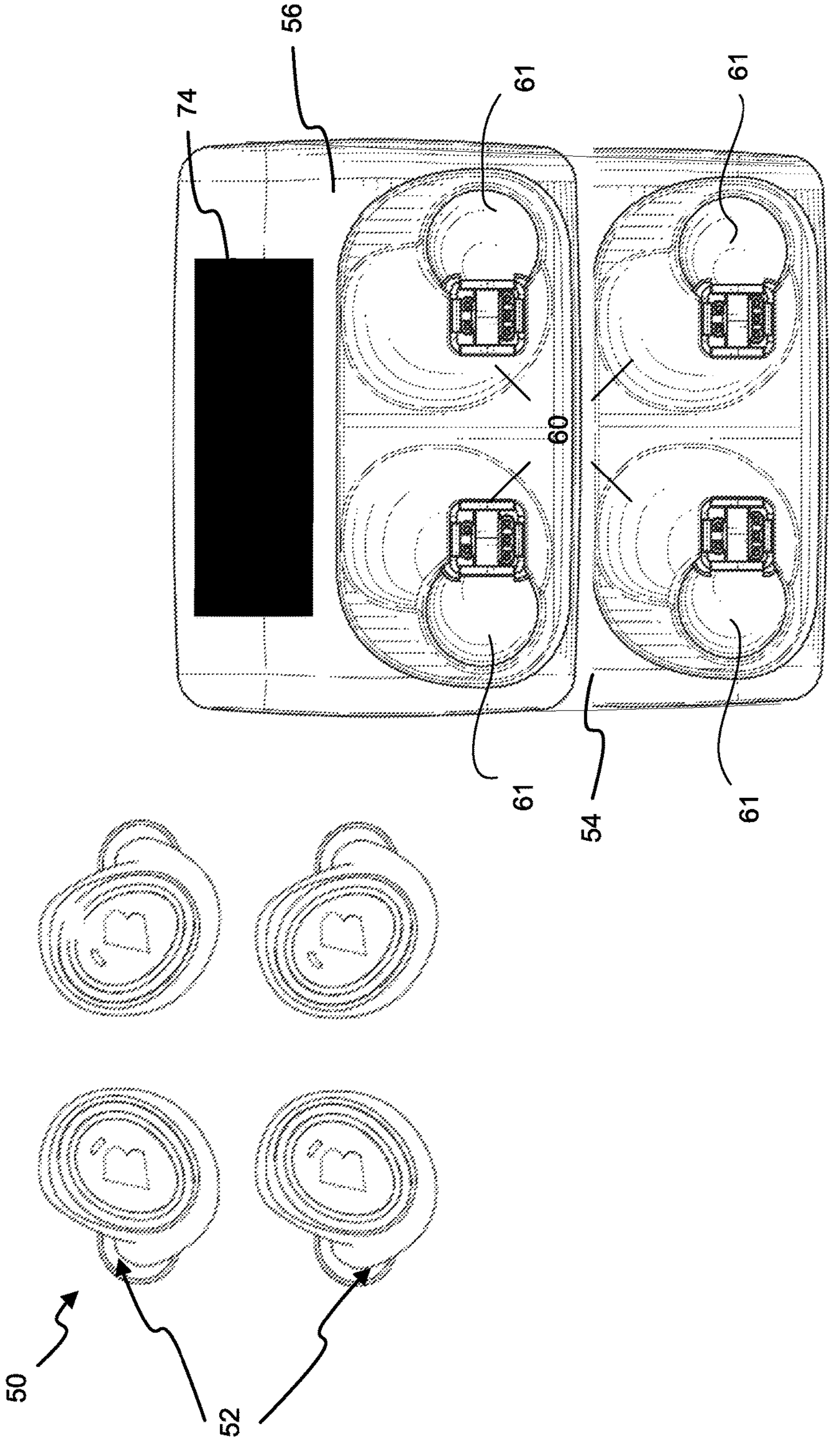
FIG. 5 illustrates a system including a plurality of sets of earpieces and a smart case.

FIG. 5 illustrates a system 50 having a plurality of earpieces 52 including a first set of left and right earpieces and second set of left and right earpieces and a smart case 54. The smart case 54 includes a plurality of receptacles 61. There is a connector or earpiece interface 60 associated with each of the plurality of receptacles for charging or charging and providing a data interface between the earpieces and the case when the earpieces are seated in the case 54. The smart case 54 includes a case housing 56. A display 74 may be positioned on one or more surfaces of the case housing 56 and used to provide information such as information regarding one or more of the earpieces such as charging status, or other information. The display may 74 be a color display, a monochromatic display, or e-ink display, which may allow a user to take notes on the smart case or otherwise annotate a subject of interest if necessary.

Figure 6:
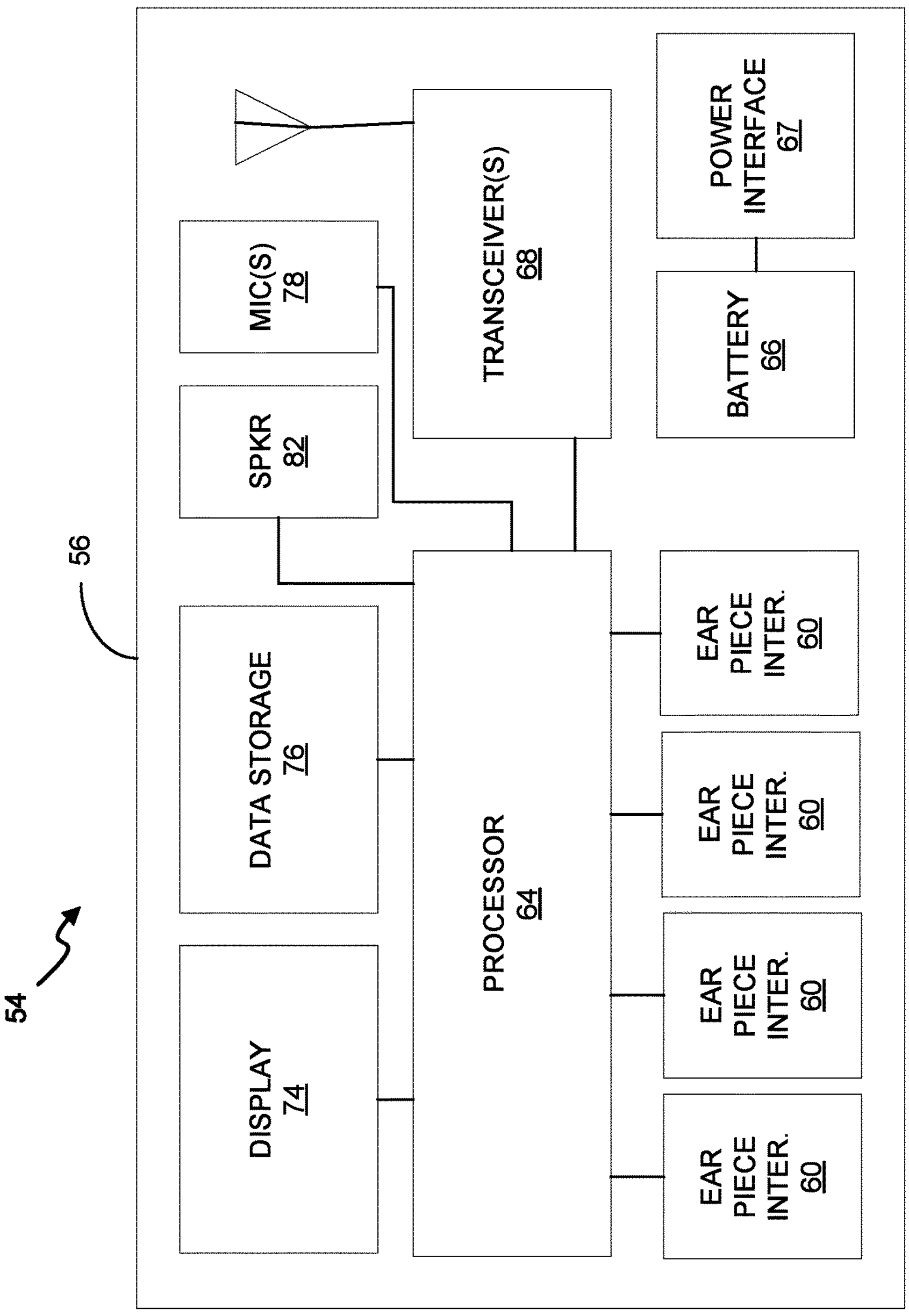
FIG. 6 illustrates a block diagram for the smart case.

FIG. 6 illustrates a block diagram of on example of the smart case 54 having a case housing 56. Disposed within the case housing 56 is a processor 64 which may include one or more processors and associated circuitry. The processor 64 may be operatively connected to each of a plurality of ear piece interfaces 60 to allow for the transfer of data between the smart case and earpieces. One or more transceivers 68 are also operatively connected to the processor 64. The one or more transceivers 68 may be used to wirelessly communicate with earpieces, mobile devices, or other computing devices. The smart case 56 may also include a display 74 as previously described which may be operatively connected to the processor 64. One more sensors such as microphones may also be operatively connected to the processor 64. Other types of sensors may also be present. A battery 66 is shown which may be disposed within the case and may be used to charge the earpieces. A power interface 67 is operatively connected to the battery. The power interface may be an AC adapter interface, a USB interface, or other type of power interface.

One or more processors 64 disposed within the smart case 54 may be configured to synchronize data received from one or more earpieces of an earpiece set such that the audio files provided by one earpiece in one earpiece set can be readily transferred with minimal interruption to another earpiece in another earpiece set. The synchronization may also be performed between the two earpieces of a set.

The transceiver 68 disposed within the smart case 54 may be configured to receive signals from and to transmit signals to an earpiece that is connected to the earpiece interface 60 or an earpiece in use by the user or in possession of the user or a third party. The transceiver 68 may receive or transmit more than one signal simultaneously. The transceiver 68 may be of any number of types including a near field magnetic induction (NFMI) transceiver, Bluetooth, WiFi, or otherwise.

The display 74 may be mounted onto the smart case 54 which may be configured to provide information concerning topic of interest to the user or a third party or even to provide information regarding the operation of the smart case 54 or one of the earpieces of an earpiece set 52. The display 74 may also be configured to be an e-ink display, where the user may take notes regarding something the user heard on an earpiece or annotate something either seen on the display or heard through an earpiece set 52. The display 74 may be in color or may be in monochrome.

A data storage device 76 onboard or operatively connected to the smart case 54 may contain data related to earpiece synchronization or data in relation to a topic of interest of the user. The data storage device 76 may be any device having either volatile or non-volatile memory that is accessible by the user or a component of an earpiece set. In some embodiments the data storage device 76 may be located remotely and accessed over a network.

One or more microphones 78 may be mounted onto the smart case 54 and may be configured to receive audio inputs controlling the functionality of either the smart case 54 or one or more earpieces in an earpiece set 52.

One or more speakers 82 may be mounted onto the smart case 54 and configured to provide audio output. The transmitted audio output may consist of media, which may include music, live or recorded broadcasts, podcasts, news, commentary, advertisements, alerts, talk shows, audio components of online videos or postings from sites such as Facebook, YouTube or Vine, or a combination of the aforementioned, one or more sounds, or instructions. The aforementioned list is non-exclusive. The speakers 82 may be configured or controlled via the microphone 78 by voice command, an interface attached to the smart case 54, or an application installed on a mobile device. Thus, audio stored on one or more of the earpieces may be reproduced by the smart case or the smart case may serve as a speaker unit for the earpieces whether the earpieces are mounted in the case or not mounted in the case but in wireless communication with the smart case.

Therefore, various embodiments for a smart case have been shown and described. Although specific embodiments are provided it is to be understood that numerous variations, options, and alternatives are contemplated. It is to be further understood that elements of different embodiments may be combined if desired.

What is claimed is:

1. A system comprising:

a plurality of earpiece sets, each of the earpiece sets comprising a left earpiece and a right earpiece; and a smart case comprising:

a case housing;

a display operatively connected to the case housing;

a plurality of receptacle sets disposed within the case housing, wherein the receptacle sets are configured to hold the plurality of earpiece sets;

a processor disposed within the case housing, wherein the processor is configured to synchronize with a processor disposed within an earpiece within the plurality of earpieces sets and transfer files between the smart case and the earpiece, wherein a file of the files transferred between the smart case and the earpiece is used for reconfiguring an operation of the earpiece;

a microphone operatively connected to the processor; and a transceiver disposed within the housing and operatively connected to the processor.

2. The system of claim 1 wherein the display is an e-ink display.

3. The system of claim 1 wherein the smart case further comprises a power interface.

4. The system of claim 3 further comprising a battery disposed within the case housing and operatively connected to the power interface.

5. The system of claim 1 wherein the smart case further comprises a speaker operatively connected to the processor and wherein the processor provides for receiving audio wirelessly from an earpiece and transducing the audio at the speaker.

6. The system of claim 1 wherein the smart case further comprises a speaker operatively connected to the processor and wherein the processor provides for receiving audio from an earpiece positioned within one of the receptacle sets and transducing the audio at the speaker.

7. A smart case for a plurality of sets of wireless earpieces, the smart case comprising:

a case housing;

a plurality of ear piece receptacles disposed within the case housing, wherein the ear piece receptacles are configured to hold earpiece within the plurality of sets of wireless earpieces;

a plurality of earpiece interfaces to connect with each of the earpieces within the earpiece sets when the earpieces are within receptacles a display operatively connected to the case housing;

a processor disposed within the case housing; and a transceiver disposed within the housing and operatively connected to the processor;

wherein the processor is configured to communicate with the earpieces when the earpieces are positioned within the ear piece receptacles and connected with the earpiece interfaces;

wherein the processor is configured to synchronize data between one or more of the earpieces and the smart case;

wherein the processor is further configured to transfer a file between one or more of the earpieces for reconfiguring an earpiece operation, and wherein the processor is configured to wirelessly communicate when the earpieces are not connected with the earpiece interfaces using the transceiver.

8. The smart case of claim 7 wherein the data comprises audio files.

9. The smart case of claim 7 further comprising a rechargeable battery disposed within the smart case.

10. The smart case of claim 9 further comprising a power interface operatively connected to the rechargeable battery for charging the rechargeable battery.

11. The smart case of claim 7 further comprising a microphone operatively connected to the processor.

* * * * *